T. H. THOMPSON.
COMBINED HARROWER AND LEVELER.
APPLICATION FILED MAR. 25, 1920.
1,364,007.
Patented Dec. 28, 1920.
3 SHEETS—SHEET 1.
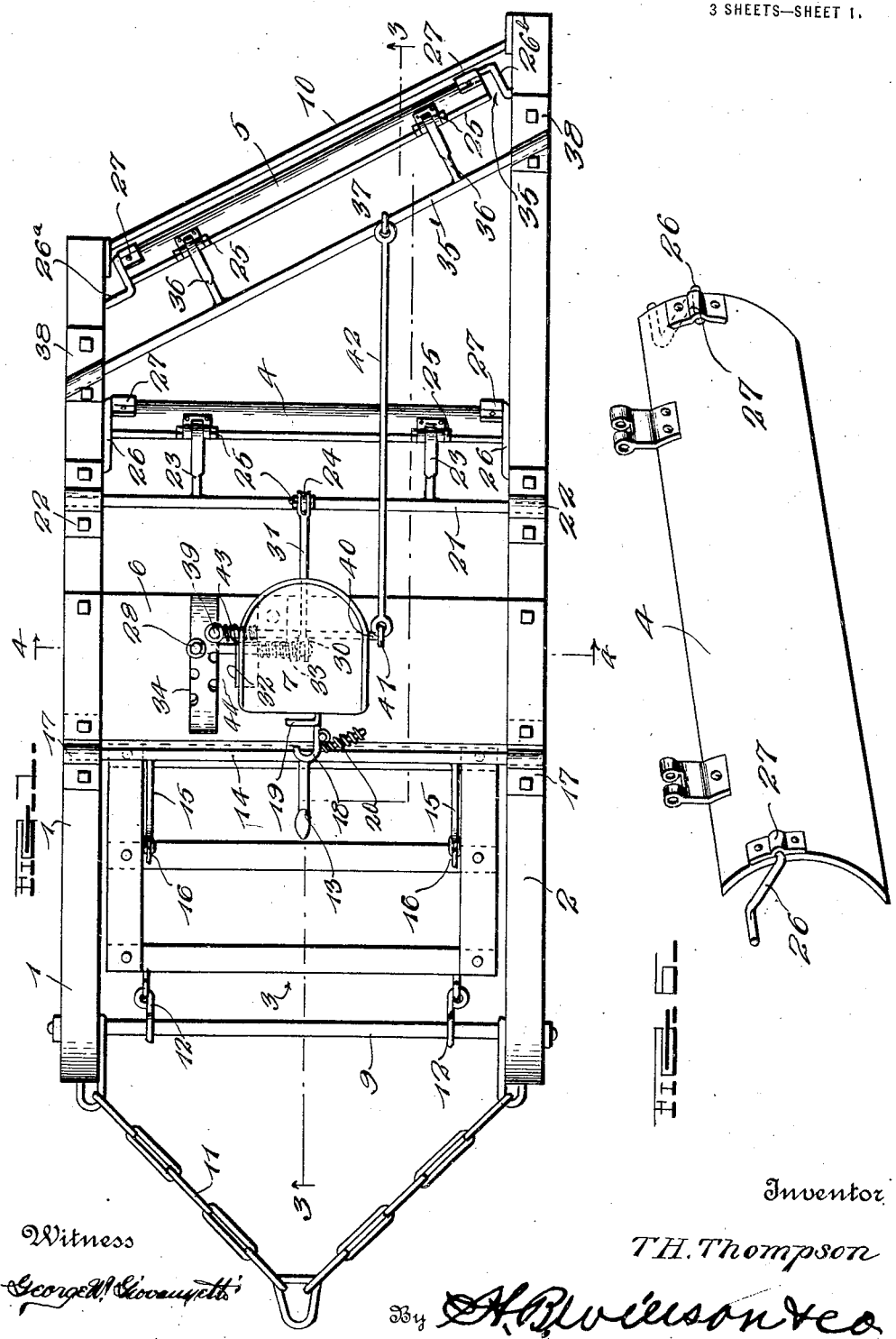
Witness
George W. Giovanetti
Inventor
T. H. Thompson
By H. B. Wilson & Co.
Attorneys

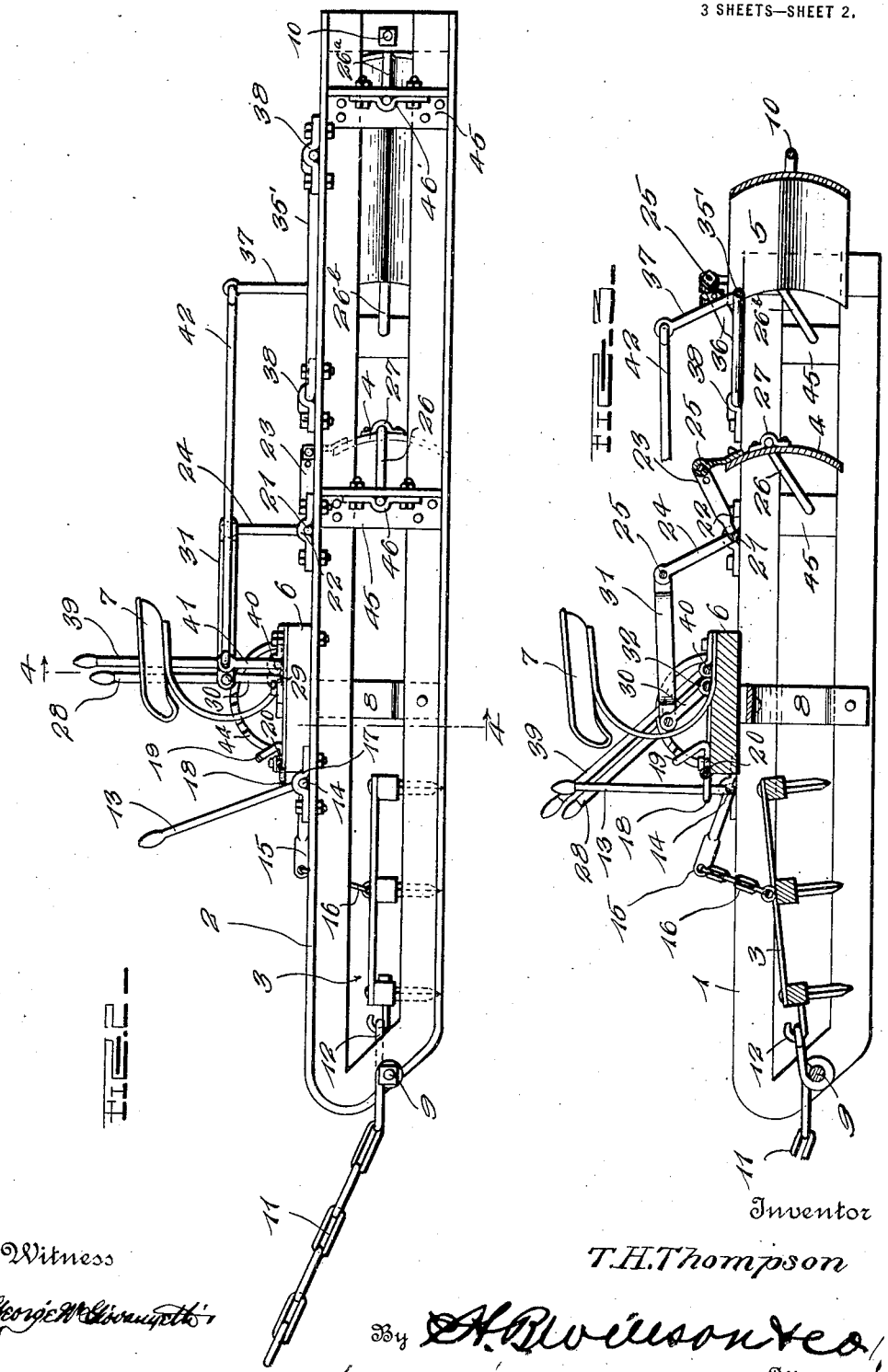

T. H. THOMPSON.
COMBINED HARROWER AND LEVELER.
APPLICATION FILED MAR. 25, 1920.
1,364,007.
Patented Dec. 28, 1920.
3 SHEETS—SHEET 3.
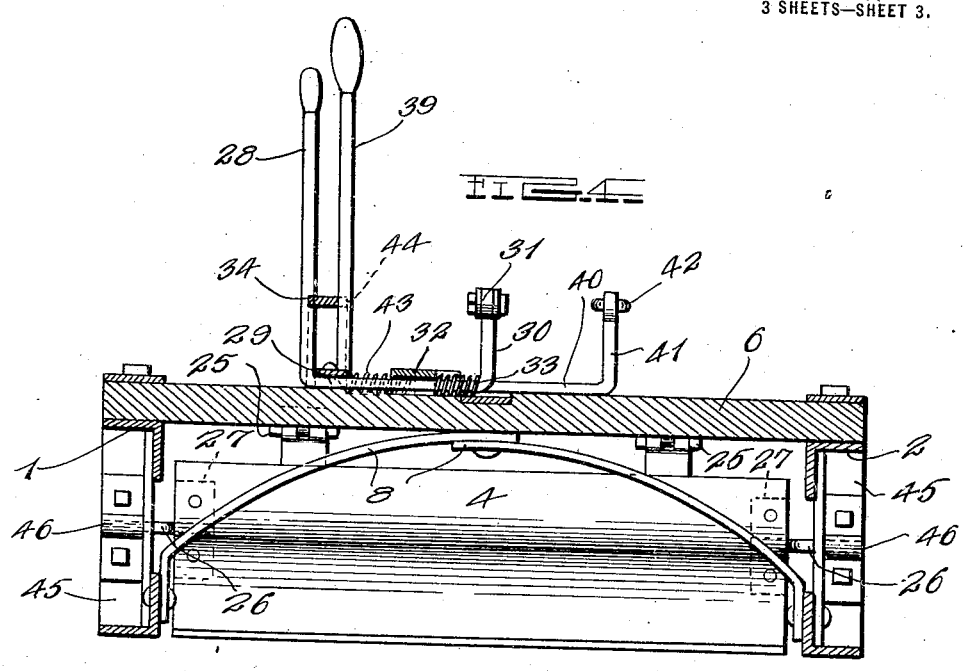
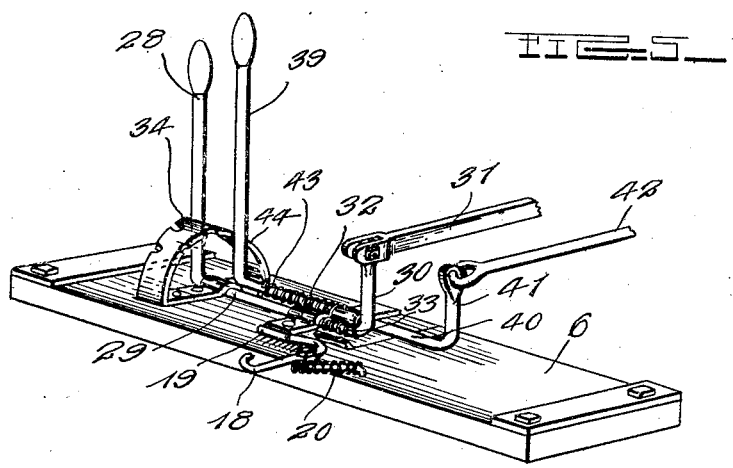
Witness
Inventor
T. H. Thompson
By
Attorneys

UNITED STATES PATENT OFFICE.

THOMAS H. THOMPSON, OF SPRING CITY, UTAH.

COMBINED HARROWER AND LEVELER.

1,364,007.　　　　Specification of Letters Patent.　　Patented Dec. 28, 1920.

Application filed March 25, 1920.　Serial No. 368,585.

*To all whom it may concern:*

Be it known that I, THOMAS H. THOMPSON, a citizen of the United States, residing at Spring City, in the county of Sanpete and State of Utah, have invented certain new and useful Improvements in a Combined Harrower and Leveler; and I do declare the following to be a full, clear, and exact description of the invention, such as will enable others skilled in the art to which it appertains to make and use the same.

This invention relates to tilling devices, and more specifically to a combined harrow and leveler.

One object of this invention is to generally improve upon devices of this character by providing an improved agricultural implement that is operable to simultaneously harrow and level a piece of ground; also to harrow without leveling and level without harrowing the ground; also to carry loose earth straight forward in any elected part of the path it travels, then to shift this loose earth, clods, etc., laterally of its path of travel and discharge the same in such position that the clods can be pulverized by a subsequent trip of the harrow in a path slightly overlapping the previously harrowed and leveled path; also to fill depressions in a path to be subsequently traveled for preparing this subsequent path for a more complete harrowing.

Other objects and advantages will be pointed out or implied in the following details of description in connection with the accompanying drawings, in which:

Figure 1 is a top plan view of the complete device.

Fig. 2 is a side elevation of the device.

Fig. 3 is a longitudinal vertical sectional view taken substantially along the line 3—3 of Fig. 1.

Fig. 4 is a transverse vertical sectional view taken substantially along the line 4—4 of Figs. 1 and 2.

Fig. 5 is a perspective view illustrating a bridge which connects the runners and supports the driver's seat and a portion of the controlling mechanism.

Fig. 6 is a perspective view of one of the land-smoothing blades or leveling blades, together with the links which connect it to the runners.

Referring to these drawings in detail, in which similar reference characters correspond with similar parts throughout the several views, the invention consists in the construction and arrangement of parts that will now be described as follows:

Briefly described, the device comprises two spaced runners, 1 and 2, respectively, a harrow 3, a front leveling blade 4, a rear leveling blade 5, a supporting bridge 6, a driver's seat 7, and the connecting and controlling devices which will now be described in their specific relation to the members 1 to 7, inclusive.

The runners 1 and 2 are similar in all respects except that the runner 2 has a greater length from the blade 4 to the blade 5 than the runner 1, each of these runners being preferably formed on angle-irons, as illustrated in Fig. 4, although the invention is not limited to this particular construction. The bridge 6 is secured to the top of the runners 1 and 2 by bolts or other appropriate means as illustrated, and one or more brace bars 8 extend from the middle portion of this bridge to the lower portions of the runners 1 and 2 and are connected thereto by bolts, rivets or other appropriate means, as illustrated. A brace bar or strut 9 connects the front ends of the runners 1 and 2, and a somewhat similar strut 10 connects the rear ends of these runners, and it will be seen that the runners are held in spaced relation with one another by means of these struts 9, 10, the bridge 6, and also the brace bars 8. The strut 9 serves also as a draft connection to which a chain 11 or other appropriate draft means can be attached or secured. Moreover, the bar or strut 9 serves as a draft connection for the harrow 3, this harrow being connected to the strut 9 by means of a flexible connection such as illustrated at 12, said connection permitting the harrow to be moved up and down and also to have a limited floating or lateral movement while resisting this lateral movement by the friction of these flexible connections where they embrace the strut 9. This harrow is raised and lowered by means of a lever 13, through the medium of a rock shaft or fulcrum 14, an arm 15 of the lever 13 extending forward and being connected with the harrow through the medium of a chain 16, suitable bearings 17 being mounted on the runners 1 and 2. It will be seen, therefore, that the harrow can be lowered into operative or ground-engaging position, and may be raised out of ground-engaging position by means of the lever 13. A latch, hook or detent 18 is pivotally mounted on the platform or bridge 6, and a pedal 19 is formed on one end of the lever of which the detent 18 is a part. A spring 20 causes the detent 18 to engage with the lever 13 when the latter is pulled rearward, so that this detent 18 co-acts with the lever 13 and its adjuncts to maintain the harrow in its inoperative position. The pivot of this latch extends up from the bridge 6, and by pushing the pedal 19 forward, the latch can be disengaged from the lever 13.

A rock shaft 21 is journaled in bearings 22 on the runners 1 and 2, and this rock shaft is provided with substantially horizontal arms 23 and a substantially vertical arm 24. The arms 23 are each pivotally connected to the blade 4 by a pivot or bolt indicated at 25. Links 26 are pivotally connected to the respective runners 1 and 2, and extend rearward and in a substantially horizontal direction to a pair of bearings 27 on the ends of the blade 4, and these links 26 are pivotally connected to the blade 4 by means of these bearings 27. The rock shaft 21 and its adjunct co-act with a lever 28 for raising and lowering the blade 4, the lever 28 having its fulcrum in the rock shaft 29 and having an arm 30 which connects with the arm 24 through the medium of a link 31, this link being pivotally connected to the arms 30 and 24 as illustrated. A bearing 32 is secured on the bridge 6, and the rock shaft 29 is journaled in this bearing. A spring 33 surrounds the rock shaft 29 and normally holds it in engagement with one of the notches of a series formed in a segment 34, and the lever 28 may be moved from one to another of these notches, so as to hold this lever and the members controlled thereby in a predetermined position; that is, the lever 28 is interchangeable with relation to the series of notches in the segment 34, for effecting different vertical adjustments of the blade 4. It is to be understood that the link 31, the arm 24 and the pivotal connections thereof yield sufficiently to permit this interchanging of the lever 28.

The blade 5 is disposed diagonally with relation to the runners 1 and 2, and a sufficient space, indicated at 35, is provided between the rear end of this blade and the inner side of the runner 2 to permit clods, stones, etc., to pass therethrough after they have been deflected from the path of this blade. The blade 5 can be raised and lowered by a controlling device similar to that described for the blade 4, but certain of the controlling elements are different from those previously described, and will now be described in detail.

A rock shaft 35' is provided with rearwardly extending and substantially horizontal arms 36 and a substantially vertical arm 37, this rock shaft being journaled in bearings 38 on the runners 1 and 2. The pivotal connections 25 are similar to those described for blade 4, and this blade 5 is provided with bearings 27 similar to those previously described. Links 26$^a$ and 26$^b$ are pivotally connected with these bearings 27 and with the runners 1 and 2, these links are substantially horizontal. It is to be understood that the links 26, 26$^a$ and 26$^b$ secure the blades 4 and 5 against rearward movement while permitting them to move up and down without materially changing their angular position relative to the surface on which they operate. A lever 39 has its fulcrum in a rock shaft 40 and is provided with an arm 41 which is pivotally connected with the arm 37 through the medium of a link 42. A spring 43 surrounds the rock shaft 40 and normally holds the lever 39 in engagement with one notch of a series formed in a segment 44, and it is obvious that by shifting the lever 39 from one to another of the notches in this segment, the blade 5 will be vertically adjusted by means of the lever 39, and its connections with the blade 5.

Although the segments 34 and 44 are shown as being integrally united with one another, they may be properly considered as two contiguous segments having oppositely facing series of notches or teeth. This member 34—44 is secured on the bridge 6 adjacent to the left hand side of the seat 7, so that the levers 28 and 39 will be convenient to the right hand of an operator or driver in the seat 7 while his left hand is engaged with the reins.

Referring now to Fig. 2, it will be seen that the upper and lower angle-beams of these runners are held in parallel, spaced and rigid relation to one another by means of upright angle bars 45 which are provided with bearings 46 with which the forward ends of links 26, 26$^a$ and 26$^b$ are pivotally connected or journaled. The pivots of the links 26, 26$^a$ and 26$^b$ are preferably formed integrally with these links, as illustrated in Figs. 1 and 2. The arms 23 and 36 are preferably provided with a plurality of openings through which the pivots 25 can extend, so that by shifting the pivot 25 from one to another of these openings, the forward and rearward inclination of the blade 4 and of the blade 5 can be adjusted.

The operation of this device is as follows:

The device is drawn over plowed ground or other uneven ground, and in case there are clods on this ground, the harrow tends to pulverize the same, however such clods and other matter which escapes from the harrow unpulverized is carried either forwardly or laterally by the blades 4 and 5, according to the desire of the operator; for instance, if there is a depression in the ground directly in front of the device, the blade 4 may be employed for carrying the clods, stones, etc., forward and depositing them in such depression; but if such depression occurs to the left of the path to be traveled by the device, such clods, stones, etc., are carried laterally by the blade 5, it being understood that, in this event, the operator raises the blade 4 to permit such clods, etc., to pass into contact with the blade 5. Because of the diagonal relation of the blade 5 with respect to its path of travel, these clods and stones will be deflected toward the runners 2 and will pass out through the opening 35. Now, when the harrow makes a subsequent trip along and slightly overlapping the path now being traveled, the harrow 3 again passes over the clods which have passed through the opening 35 and has another chance to pulverize the same.

From the foregoing description of the construction and operation of this device, it will be seen that all the elements of this device co-act in properly preparing a piece of ground for seed planting.

Although I have described this embodiment of my invention very specifically, it is not intended to limit this invention to these exact details of construction and arrangement, but changes may be made within the scope of the inventive ideas as implied and claimed.

I claim:

1. In a combined harrowing and leveling device, a supporting frame including spaced runners, a harrow supported by said frame and disposed between said runners, a leveling blade supported by said frame and extending approximately from one to the other of said runners in a substantially perpendicular relation to the length of the runners, a second leveling blade supported by said frame, said second blade being disposed between and extending diagonally to the length of said runners, the rear end of this diagonal blade being spaced from the runners to permit clods and other matter to pass between this blade and one of said runners, and means on said frame to shift said harrow and blades independently of one another.

2. In a tilling device, a supporting frame comprising two spaced runners and a bridge spanning the space between the runners and supported by the latter, two land-moving members supported by said frame, shifting devices connected respectively to said land-moving members and being operable to shift these members with relation to said frame, a pair of contiguous oppositely facing segmental sets of teeth mounted on said bridge, a bearing on said bridge under said contiguous sets of teeth, a rock shaft journaled in said bearing, an arm on said rock-shaft, a link connecting said arm to one of said shifting devices, a manipulative arm on said rock shaft and being interchangeably engageable with the teeth of one of said sets, a second rock shaft journaled on said bridge, means operatively connecting said second rock shaft to the other one of said shifting devices, and a second manipulative arm, the latter being united with said second rock shaft and in position to interchangeably engage with the teeth of the other one of said sets.

3. In a tilling device, a pair of spaced runners each provided with a pivot bearing, a land-moving blade provided with pivot bearings at its ends, substantially horizontal links connecting the pivot bearings of said runners with those of said blade, a rock-shaft journaled on said runners and provided with a substantially vertical arm and substantially horizontal arms, the latter being pivotally connected to said blade at points superadjacent to the said links, and means connected to said substantially vertical arm for causing it to rock said rock shaft and thereby vertically adjust said blade while their angular relation to the path of the runners remains substantially unchanged.

4. In a tilling device, a pair of spaced runners, a harrow disposed between said runners and having vertical and lateral movement relative to the runners, flexible connections between said harrow and runners for enabling the harrow to be drawn by said runners and permitting while resisting the lateral movement of the harrow, and means including a lever mounted on said runners for lowering and raising the harrow to and from the ground.

In testimony whereof I have hereunto set my hand.

THOMAS H. THOMPSON.